United States Patent [19]

Hehl

[11] 4,325,287

[45] Apr. 20, 1982

[54] HYDRAULIC ACTUATOR FOR INJECTION MOLDING MACHINE

[76] Inventor: Karl Hehl, Arthur-Hehl-Strasse, 7298 Lossburg 1, Fed. Rep. of Germany

[21] Appl. No.: 86,435

[22] Filed: Oct. 19, 1979

[30] Foreign Application Priority Data

Oct. 19, 1978 [DE] Fed. Rep. of Germany ....... 2845448

[51] Int. Cl.³ .............................................. F15B 11/18
[52] U.S. Cl. ........................................ 91/422; 91/519; 425/451.2; 425/590
[58] Field of Search .......................... 91/422, 517, 519; 425/451.2, 590, DIG. 223

[56] References Cited

U.S. PATENT DOCUMENTS

| | | | |
|---|---|---|---|
| 3,935,791 | 2/1976 | Hehl | 91/517 |
| 4,158,327 | 6/1979 | Aoki | 425/590 X |

*Primary Examiner*—Gerald A. Michalsky
*Attorney, Agent, or Firm*—Joseph A. Geiger

[57] ABSTRACT

A hydraulic actuator assembly for use in the die closing unit of an injection molding machine, the actuator assembly having a large power cylinder and a smaller travel cylinder with a large power piston and a small travel piston on a common piston rod, and bypass channels in the power piston which are openable and closable by means of an annular valve plunger moving on a guide sleeve on the piston rod. The valve plunger and the guide sleeve have three stepped cooperating sliding diameters forming bypass opening and closing plunger pressure spaces. Hydraulic pressure is supplied to the two pressure spaces through bores in the piston rod.

9 Claims, 3 Drawing Figures

HYDRAULIC ACTUATOR FOR INJECTION MOLDING MACHINE

BACKGROUND OF THE INVENTION

1. Field of the Invention

The present invention relates to injection molding machines, and, more particularly, to a hydraulic actuator assembly which serves to open and close the two halves of an injection molding die in the die closing unit of the machine.

2. Description of the Prior Art

The hydraulic actuator assembly of a die closing unit has to fulfill two major functions, one being to open and close the injection molding die as rapidly as possible over an opening stroke which is adjustable in accordance with the axial depth of the die cavity, the other being to exert a high clamping force on the closed injection molding die. These two functions require different hydraulic characteristics: The high clamping pressure requires a large piston diameter, whereas the opening and closing travel calls for a relatively small pressure surface, in order to attain rapid movements without the need for inordinate fluid pumping capacity.

To obtain this dual function in a hydraulic actuator with a maximum of efficiency, it has already been suggested to use a controllable flow bypass arrangement in connection with the power piston of the main hydraulic cylinder, so that the hydraulic fluid, instead of being displaced by the power piston during the opening and closing travel, flows through or around the moving power piston. This piston then becomes either a differential piston with a small effective pressure surface, or it is completely neutralized, while a small auxiliary piston provides the force for the opening and closing movements.

In my U.S. Pat. No. 3,935,791, I have disclosed several embodiments of a hydraulic actuator assembly which features a bypassable power piston and an auxiliary travel piston. The two pistons are arranged on a common piston rod. The bypass of the power piston is accomplished by means of a series of bypass channels which extend through the body of the power piston, from one axial side to the other, and are enclosed on one side within a concentric valve seat, so that the axial movement of an annular valve plunger on the piston rod opens and closes the bypass channels.

This type of power piston with valve-controlled bypass can be used in connection with both pull-type and push-type die closing units. (In a pull-type die closing unit, the stationary die half is arranged axially between the movable die half and two or more pulling hydraulic actuators whose piston rods also serve as tie rods. In a push-type die closing unit, the movable die half is arranged axially between the stationary die half and a coaxially aligned hydraulic actuator whose piston rod pushes the injection molding die closed.) In both cases, the annular valve plunger is arranged in the high pressure space of the power cylinder, i.e. on that side of the power piston which has to be pressurized, in order to obtain the elevated closing pressure.

The aforementioned patent discloses several configurations for the power piston and the cooperating bypass valve plunger, including a hydraulic supply line which leads axially through the piston rod to a plunger pressure space, for the hydraulic initiation of an axial movement of the annular valve plunger. The plunger pressure space is in all cases so arranged in relation to the configuration of the valve plunger that its pressurization opposes the effect of hydraulic pressure in the high pressure space of the power cylinder. The interaction between these two pressure spaces controls the opening and closing movements of the annular valve plunger. The pressure inside the high pressure space of the power cylinder produces a valve-opening action, when the annular valve plunger is designed as a piston with an outer sliding diameter larger than the diameter of the valve seat. A spring may be used to influence the axial movement response of the valve plunger. In this case, the plunger pressure space is arranged to create a valve closing movement of the valve plunger under pressurization. Alternatively, the shape of the annular valve plunger may be such that the pressure inside the high pressure space creates a valve closing movement of the valve plunger, in which case the plunger pressure space is arranged to create an opposing valve opening movement.

The use of an axially movable annular valve plunger in the high pressure space of the power cylinder makes it possible to attach the power piston to the piston rod, and it also lends itself for an arrangement of the bypass channels in the body of the power piston in such a way that a smooth flow configuration is obtained. A threaded sleeve on the piston rod provides a clamping action for the power piston, while also serving as a guide sleeve for the annular valve plunger. A larger diameter of the piston rod in the low pressure space of the power cylinder not only provides a clamping shoulder for the power piston, but also serves to convert the hydraulic actuator into a differential-piston actuator, when the bypass channels are open.

From my U.S. Pat. No. 3,663,140, it is also known to arrange two hydraulic supply lines in the piston rod of a bypassable power piston, for the generation of bypass opening and closing movements. In this case, however, these movements are executed by the power piston itself which is arranged to axially move in relation to the piston rod, thereby producing the desired valve action in cooperation with a collar formation on the piston rod. The possibility of being able to control the opening and closing movements of the bypass valve, independently of the pressure conditions in the pressure spaces of the power cylinder, brings with it a greater freedom of hydraulic programming for the actuator assembly. It may be desirable, for example, to generate a short burst of high power at the beginning of the die opening stroke, in cases where the configuration of the mold cavity is such that the finished part creates a high frictional resistance during the initial separation of the die halves.

SUMMARY OF THE INVENTION

Underlying the present invention is the primary objective of achieving an improvement over the above-described known hydraulic actuator assemblies by modifying the configuration of the bypass controlling annular valve plunger in such a way that it offers the independent controllability of the valve opening and closing movements in a way which, previously, was known only in connection with a hydraulic actuator assembly in which the power piston executes the valve opening and closing movements, through axial displacements in relation to the piston rod.

The present invention proposes to attain this objective by suggesting an improved hydraulic actuator assembly of the type which features an annular valve plunger in the high pressure space of the power cylinder, where the power piston is held in place on the piston rod by means of a guide sleeve with a central collar portion of enlarged guide diameter and axially adjacent sleeve portions with smaller guide diameters, and where the annular valve plunger has three matching bore portions of which the outer one is formed by a removable end flange, so as to define opposing plunger pressure spaces on both sides of the collar portion of the guide sleeve. These pressure spaces receive hydraulic fluid through separate supply lines which extend axially through the piston rod.

The bypass valve configuration of this invention thus combines the advantages of the two earlier-described hydraulic actuator assemblies, inasmuch as it maintains the compact arrangement of the actuator assembly of U.S. Pat. No. 3,935,791, while also offering the independent programmability of the opening and closing movements of the bypass valve, as known from U.S. Pat. No. 3,663,140.

In a preferred embodiment of the present invention, the two guide portions of the guide sleeve, on opposite sides of its collar portion, are of unequal diameter, with a larger diameter on the rear guide sleeve portion, so that it becomes possible to selectively utilize the pressure in the power cylinder to move the annular valve plunger into its open position.

BRIEF DESCRIPTION OF THE DRAWINGS

Further special features and advantages of the invention will become apparent from the description following below, when taken together with the accompanying drawing which illustrates, by way of example, an embodiment of the invention which is represented in the various figures as follows.

DESCRIPTION OF THE PREFERRED EMBODIMENT

Figure 2:
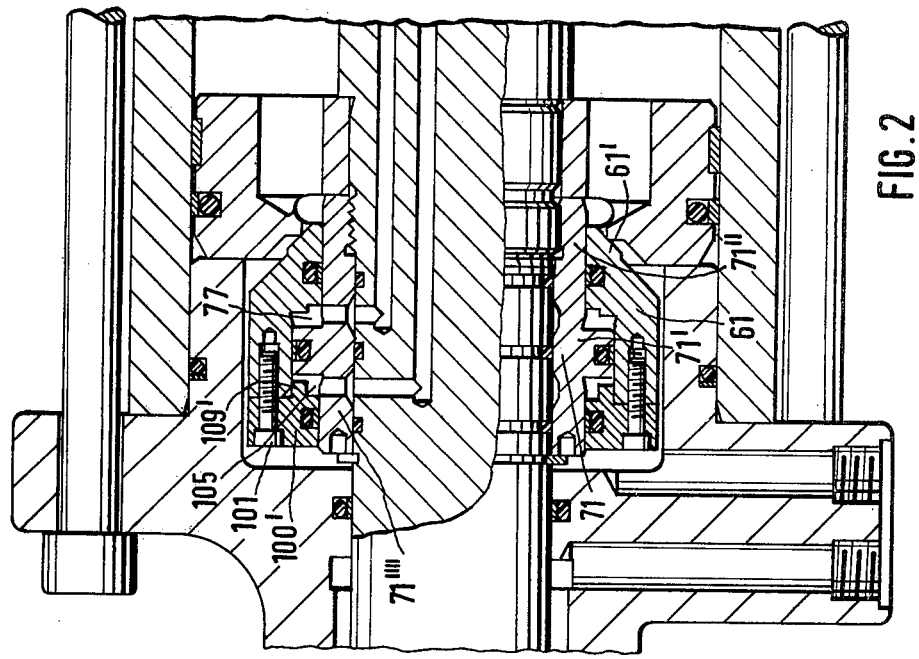
FIG. 2 shows the assembly of FIG. 1 with a modified bypass valve mechanism.
Figure 1:
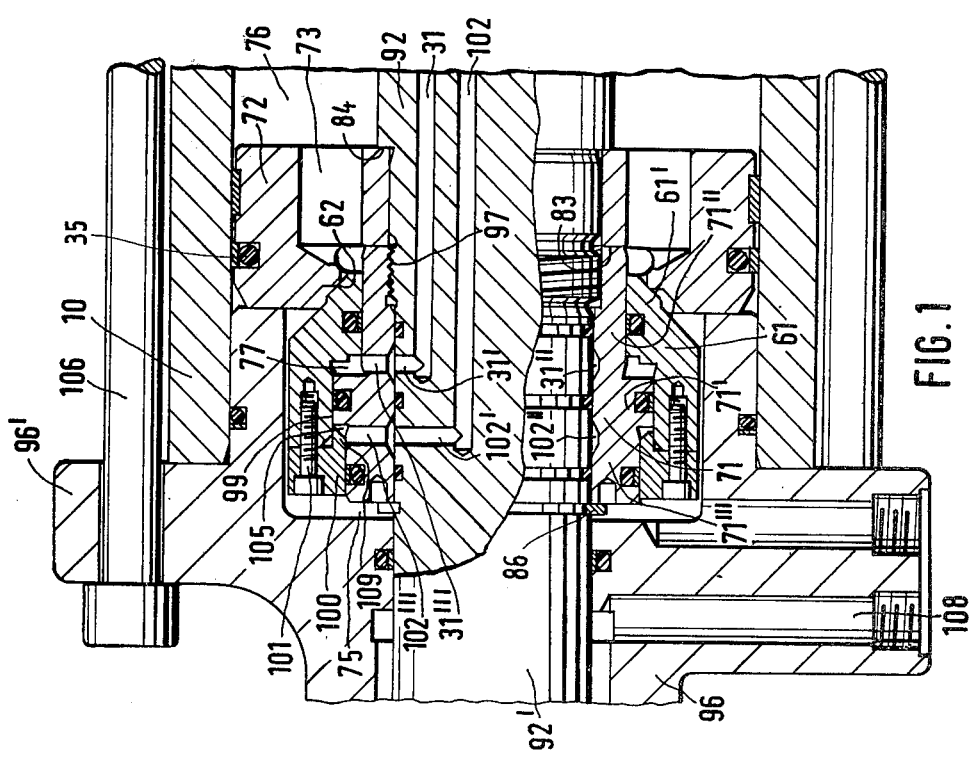
FIG. 1 shows portions of a hydraulic actuator assembly, in a longitudinal cross section, with a closed hydraulic bypass valve mechanism embodying the present invention.
Figure 3:
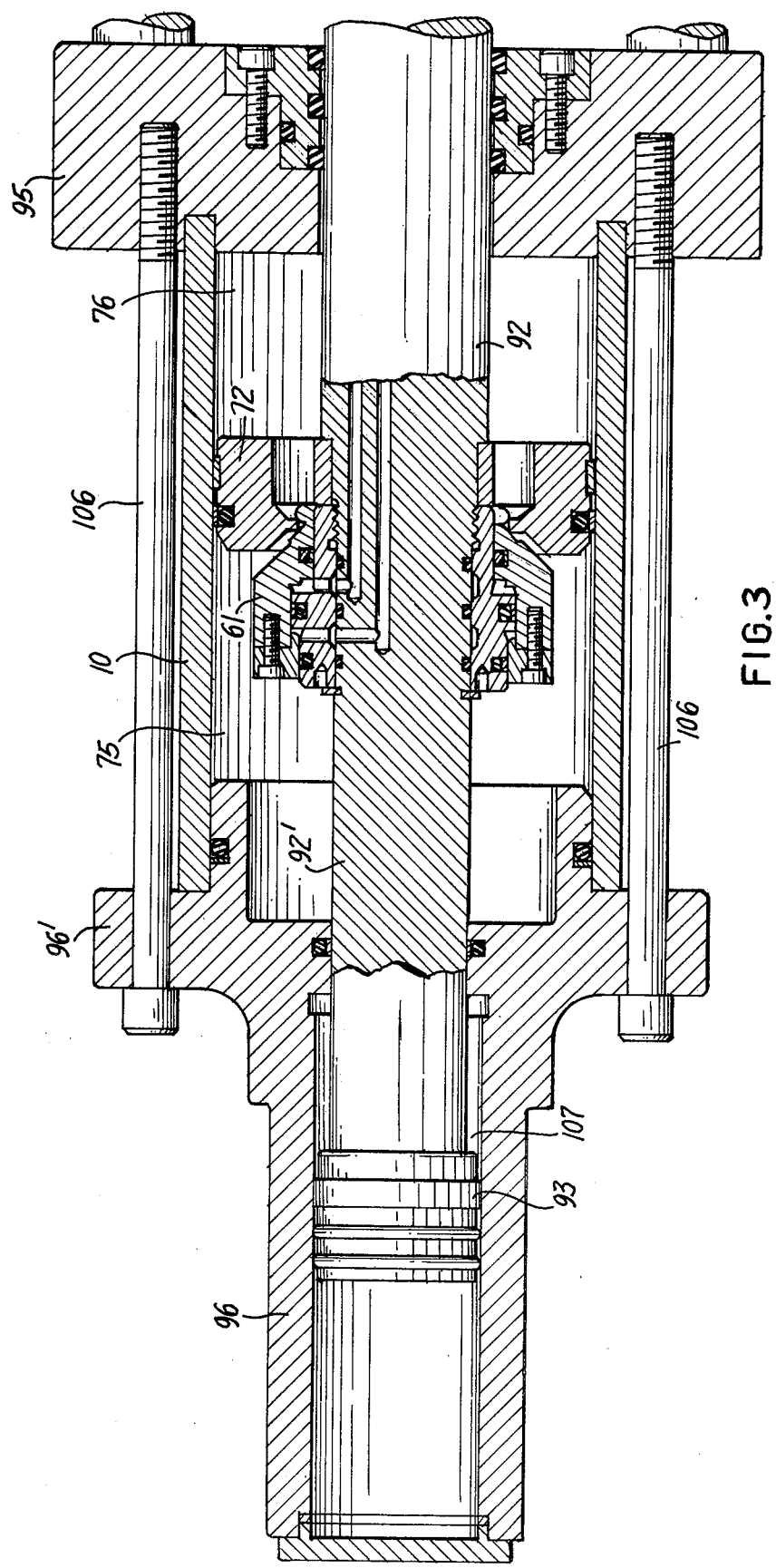
FIG. 3 shows the hydraulic actuator assembly at a smaller scale, likewise in a longitudinal cross section, as adapted for a push-type die closing unit.

FIG. 1 and FIG. 2 of the drawing show the essential parts of a hydraulic actuator assembly, as adapted for a push-type die closing unit of an injection molding machine (FIG. 3). A complete description of such a push-type die closing unit can be found in U.S. Pat. No. 4,047,871, for example. A hydraulic actuator assembly for this push-type die closing unit is described in full detail in the earlier-mentioned U.S. Pat. No. 3,935,791, the contents of which should be considered incorporated in the present disclosure.

As can be seen in the drawing, the hydraulic actuator assembly comprises a large hydraulic power cylinder 10 whose rearward extremity carries a cylinder cover 96'. Several heavy tie rods 106 clamp the rear cylinder cover 96' and the power cylinder 10 to a heavy head plate 95 on the front side of the hydraulic actuator assembly. The rear cylinder cover 96' forms an integral part of a rearwardly extending auxiliary cylinder or travel cylinder 96. The latter has a much smaller bore than the power cylinder 10, being designed to produce a rapid opening movement of the actuator assembly, a movement which requires only a reduced force on the piston rod 92. The pressure space 107 of the travel cylinder 96 receives hydraulic fluid through the supply line 108. The piston 93 of the travel cylinder 96 sits on the rear extremity of the piston rod 92, forming part of a unitary moving assembly with the power piston 72.

A seal in the cylinder cover 96' separates the pressure space 107 of the travel cylinder 96 from the high pressure space 75 of the power cylinder 10, on the rear side of the power piston 72. A piston seal 35 on the periphery of the power piston 72 separates the high pressure space 75 from a low pressure space 76 on the forward side of the power piston.

The power piston 72 is axially clamped against a shoulder 84 of the piston rod 92 by means of a threaded guide sleeve 71 which engages a threaded portion 97 of the piston rod, thereby serving as a clamping nut for the power piston 72. The tightened guide sleeve 71 is axially secured by means of a retaining ring 86 which is seated in a groove of the piston rod 92.

The guide sleeve 71 consists of three distinct axial length portions represented by a central collar portion 71' of enlarged diameter, a forwardly extending sleeve portion 71" of smaller diameter, and a rearwardly extending sleeve portion 71'" of intermediate diameter. In FIG. 2, the rearwardly extending sleeve portion 71"" has the same diameter as the forwardly extending sleeve portion 71".

On the guide sleeve 71 is supported an annular valve plunger 61 which has three bore portions with diameters that match the diameters of the three guide sleeve portions for sliding engagement therewith, so that a forward plunger pressure space 77 is formed between the flange portion 61' of the valve plunger 61 and the collar portion 71' of the guide sleeve 71, and a rearward plunger pressure space 105 if formed between a removable end flange 100 of the valve plunger 61 and the rear side of the collar portion 71' of sleeve 71. The end flange 100 is attached to the rear face of the annular valve plunger 61 by means of clamping bolts 101, a centering collar 109 serving to position the end flange 100 in a concentric relationship with the valve plunger 61.

The annular valve plunger 61, by moving axially towards and away from the power piston 72, closes and opens a flow passage in the power piston which is enclosed by a circular valve seat 62 on the rear side of the power piston 72. Behind the valve seat 62 is arranged an axial recess 73' into which open a number of axially oriented bypass channels 73 originating from the opposite side of the power piston 72. The bypass channels 73 and the valve seat 62 thus form an openable and closable bypass connection between the high pressure space 75 and the low pressure space 76 of the power cylinder 10 so that, with an open bypass connection, the power piston 72 can execute axial movements inside the power cylinder 10 without displacing the hydraulic fluid contained therein. The latter simply flows through the power piston. This allows for rapid die opening and closing movements of the hydraulic actuator assembly, without the need for a large pumping capacity.

In the open condition of the bypass valve mechanism, the piston rod 92 serves as a differential piston, having a forwardly extending piston rod length portion and cooperating seal in the head plate 95 on the front end of the power cylinder of a diameter which is larger than the diameter of the rearwardly extending piston rod portion 92' and its cooperating seal in the cylinder rear cover 96'. The larger piston rod diameter is preferably the same as that of the travel piston 93 in the travel cylinder 96, so that identical hydraulic conditions exist for an accelerated die opening movement created by the travel piston 93 in the travel cylinder 96 and for an accelerated die closing movement created by the differential-piston action of the piston rod 92, when both pressure spaces of the power cylinder 10 are pressurized and the bypass connection is open.

The opening and closing movements of the annular valve plunger 61 are obtained through the alternate pressurization of the two plunger pressure spaces 77 and 105. In order to supply hydraulic pressure to these pressure spaces, the piston rod 92 has arranged in it two axial bores 31 and 102 which are intersected by two radial bores 31' and 102', respectively, leading to annular distribution grooves 31" and 102" in the guide ring 71. Radial connecting bores 31''' and 102''' link the distribution grooves to the respective plunger pressure spaces 77 and 105.

The only difference between the hydraulic actuator assemblies of FIG. 1 and FIG. 2 is a difference in the size of the rearward plunger pressure space 105, as defined by the diameter of the rearwardly extending guide sleeve portion 71''', or 71'''', respectively. The effect of the configuration of FIG. 1 is that, due to the smaller size of the rear plunger pressure space 105, the valve plunger 61 will react to the pressure inside the high pressure space 75 by moving rearwardly, unless restrained by a control pressure in the valve-closing plunger pressure space 77.

Thus, the configuration of FIG. 1 makes it possible to open the bypass connection by simply pressurizing both pressure spaces of the power cylinder 10, without using the valve-opening plunger pressure space 105. This is not possible in the modified assembly of FIG. 2, where the flange portion 61' of the annular valve plunger 61 has the same bore diameter as the removable end flange 100, so that the valve plunger is neutral with respect to the pressure level inside the high pressure space 75 of the power cylinder 10.

The larger valve-closing plunger pressure space 105 of FIG. 1 also makes it possible to produce a higher valve opening pressure which may be necessary, when a brief pressurization of only the low pressure space 77 of power cylinder 10 is necessary for the initial separation of the injection molding die halves.

It should be understood, of course, that the foregoing disclosure describes only a preferred embodiment of the invention and that it is intended to cover all changes and modifications of this example of the invention which fall within the scope of the appended claims.

I claim the following:

1. An improvement in a hydraulic actuator assembly of the type which is usable to open and close an injection molding die in the die closing unit of an injection molding machine, which hydraulic actuator assembly includes; a power cylinder enclosing a double-acting power piston attached to a piston rod which sealingly extends through both axial extremities of the power cylinder, so as to define a high pressure space on that axial side of the power piston from which the latter moves away in a die closing stroke and a low pressure space on the opposite axial side of the power piston; an annular valve seat on the high-pressure side of the piston rod, in a concentrically spaced relationship with the piston rod; at least one bypass channel extending axially through the power piston so as to form a bypass flow connection between the two pressure spaces of the power cylinder, the bypass channel having its opening to the high-pressure side located radially within said valve seat; an annular valve plunger arranged on the piston rod, in the high-pressure space of the power cylinder, the valve plunger being axially slidable on the piston rod, for movements into and out of contact with said valve seat, thereby closing and opening the bypass flow channel; and hydraulic means for controlling the opening and closing movements of the valve plunger, the improvement in said assembly relating more specifically to the valve plunger and its hydraulic control means and comprising:

a bore formation in the valve plunger defining first, second and third cylindrical bore portions in axial succession, the first and third bore portions being smaller in diameter than the second bore portion;

three successive matching guide portions on the piston rod, the smaller-diameter first and third guide portions being located on opposite axial sides of a collar formation, and the second guide portion being defined by the periphery of the collar formation, the three guide portions cooperating with the three plunger bore portions to form first, second and third sliding seals, which define a valve-closing pressure space between the first and second sliding seals and a valve-opening pressure space between the second and third sliding seals; and two hydraulic supply lines leading to the two plunger pressure spaces, via two pressure channels in the piston rod; and wherein the outer diameter of the contact surface between the valve plunger and the valve seat on the power piston is larger than the diameter of the third sliding seal, so that the valve plunger, in its closed position, receives a closing bias from a pressure in the surrounding high-pressure space, but the effective area for this closing bias on the closed plunger is smaller than the effective area of the valve-opening pressure space; and the effective area of the valve-closing pressure space, as determined by the difference in diameter of the first and second sliding seals, is larger than the area of the valve plunger which is exposed to the fluid pressure of the low-pressure space, in the closed valve position, as determined by the inner diameter of the contact surface on the valve seat of the power piston, thereby making it possible to exert an elevated die-opening force on the power piston by simultaneously pressurizing the low-pressure space of the power cylinder and the valve-closing pressure space.

2. An improvement in a hydraulic actuator assembly as defined in claim 1, wherein the diameters of the first and third sliding seals are identical, for identically sized effective areas of the valve-opening and valve-closing pressure spaces, so that the valve plunger, in an open position, is not affected by the pressure level in the surrounding high-pressure space.

3. An improvement in a hydraulic actuator assembly as defined in claim 1, wherein the diameter of the third sliding seal is larger than the diameter of the first sliding seal, so that the valve plunger, when subjected to a pressure in the surrounding high-pressure space, receives an opening bias in an open position, while receiving said closing bias in the closed position.

4. An improvement in a hydraulic actuator assembly as defined in claim 1, 2 or 3, wherein the piston rod extends through the axial extremities of the power cylinder with piston rod portions of unequal diameter, the larger one being the piston rod portion on the low-pressure side of the power piston, so that, when the bypass flow connection of the power piston is open and both pressure spaces of the power cylinder are equally pressurized, the piston rod acts as a differential piston, producing an accelerated closing travel of the assembly.

5. An improvement in a hydraulic actuator assembly as defined in claim 1, 2 or 3, wherein the annular valve plunger comprises at least two separate annular constituent parts which are clamped together from opposite sides of the collar formation; and one of the constituent parts defines the first bore portion, while the other constituent part defines the third bore portion.

6. An improvement in a hydraulic actuator assembly as defined in claim 1, 2 or 3, wherein the collar formation on the piston rod is defined by an annular member which is fixedly seated on the piston rod.

7. An improvement in a hydraulic actuator assembly as defined in claim 6, wherein the annular member is a guide sleeve of which an enlarged central sleeve portion constitutes the collar formation that forms the second guide portion, and of which oppositely adjoining sleeve portions of smaller diameter form the first and third guide portions.

8. An improvement in a hydraulic actuator assembly as defined in claim 7, wherein the piston rod has an abutment shoulder on the low-pressure side of the power piston and a threaded length portion on the opposite side thereof;

the guide sleeve has a matching threaded length portion engaging the piston rod in the manner of a nut, thereby serving to axially clamp the power piston against the abutment shoulder.

9. An improvement in a hydraulic actuator assembly as defined in claim 7, wherein the two pressure channels in the piston rod include two axial bore portions which extend along the piston rod to the axial location of the two plunger pressure spaces and two radial bore portions which intersect the axial bore portions in approximate alignment with the plunger pressure spaces; and the hydraulic supply lines further include two annular distribution grooves on the inside of the guide sleeve, in alignment with the radial bore portions in the piston rod and radial bores in the guide sleeves leading from the two distribution grooves to the plunger pressure spaces.

* * * * *